United States Patent [19]
Namba et al.

[11] Patent Number: 5,346,777
[45] Date of Patent: Sep. 13, 1994

[54] CHEMICAL REACTION INSTALLATION

[75] Inventors: Shigeaki Namba; Tatsuo Sakamoto, both of Hitachi; Toshiki Kahara, Ibaraki, all of Japan

[73] Assignee: Hitachi, Ltd., Tokyo, Japan

[21] Appl. No.: 34,539

[22] Filed: Mar. 19, 1993

[30] Foreign Application Priority Data

Mar. 19, 1992 [JP] Japan .................. 4-063159

[51] Int. Cl.$^5$ ............................... H01M 8/24
[52] U.S. Cl. ....................................... 429/12
[58] Field of Search ...................... 429/12, 34

[56] References Cited

FOREIGN PATENT DOCUMENTS 62-229771 10/1987 Japan .
63-304581 12/1988 Japan .

*Primary Examiner*—Anthony Skapars
*Attorney, Agent, or Firm*—Antonelli, Terry, Stout & Kraus

[57] ABSTRACT

There is disclosed a chemical reaction installation in which a number of chemical reaction vessels are arranged efficiently so as to decrease an installation area while keeping a good maintainability. A processing system is provided at the inside, and a multi-story construction is provided, and access for maintenance purposes can be obtained from the side of each floor of the multi-story construction.

11 Claims, 5 Drawing Sheets

CHEMICAL REACTION INSTALLATION

BACKGROUND OF THE INVENTION

This invention relates to a chemical reaction installation, and more particularly to such an installation of the type in which a large number of chemical reaction vessels are arranged in such a manner as to increase the yield density.

A fuel cell electric power-generating installation which is one example of chemical reaction installation is provided with a number of fuel cell stacks (chemical reaction vessels) which receive fuel gas to produce an electrical output. The arrangement of the fuel cell stacks determines the installation area of the overall chemical reaction installation. Particularly, with a larger-capacity design, it becomes more important to provide the type of arrangement of chemical reaction vessels which can achieve a high yield density.

In this connection, Japanese Patent Unexamined Publication No. 62-229771 (entitled "Fuel Cell Electric Power-generating Installation") proposes an arrangement in which a building is of a multi-story construction, and chemical reaction vessels are arranged on a circle at each floor, and the chemical reaction vessels are moved in a horizontal direction by an overhead crane to effect the maintenance.

Japanese Patent Unexamined Publication No. 63-304581 (entitled "Fuel Cell Electric Power-generating Installation") proposes an arrangement in which a building is of a multi-story construction, and a plurality of chemical reaction vessels are formed at each floor by an integral block method.

Generally, when a number of chemical reaction vessels are arranged in a building in such a manner as to achieve a high yield density and also to enhance the maintainability and the availability, there are encountered several problems to be solved.

If the chemical reaction vessels are arranged in a three-dimensional manner, a unit installation area can be utilized efficiently; however, the maintainability and the availability are adversely affected. And besides, when part of the chemical reaction vessels are to be exchanged, the other chemical reaction vessels of the same system or group must also be stopped, and therefore the availability of the overall plant is adversely affected.

In this connection, in Japanese Patent Unexamined Publication No. 62-229771 (entitled "Fuel Cell Electric Power-generating Installation"), the overhead cranes, serving as power sources for horizontally moving the chemical reaction vessels, must be provided independently on the floors of the building, respectively. This increases the initial cost. In Japanese Patent Unexamined Publication No. 63-304581 (entitled "Fuel Cell Electric Power-generating Installation"), the building is of a multi-story construction and a plurality of chemical reaction vessels are formed at each floor by the integral block method, and therefore this construction is not suited for the exchange of the stack, and the output of the plant is greatly decreased at the time of the maintenance.

SUMMARY OF THE INVENTION

With the above problems in view, it is an object of this invention to provide a chemical reaction installation which can achieve high maintainability and availability.

In order to achieve the above object, in the present invention, a plurality of floors are provided on a pillar in spaced relation to one another in a direction of a height of the pillar, and a plurality of chemical reaction vessels are provided on each of the floors. A reactive group necessary for a chemical reaction is supplied to each of the chemical reaction vessels from a cavity portion formed within the pillar, and an electrical output produced in the chemical reaction vessel is taken out via an electrical bus formed in the pillar. Electrical output is one of process variables. When repairing any one of the chemical reaction vessels, only this chemical reaction vessel to be repaired is removed from the floor by a crane.

According to the present invention, the reaction field of the chemical process, its input line, its output line, the maintenance space and so on can be rationally utilized in a three-dimensional manner, and therefore the installation area can be reduced to a minimum, and the maintainability can be enhanced.

DESCRIPTION OF THE PREFERRED EMBODIMENTS

Figure 1A:
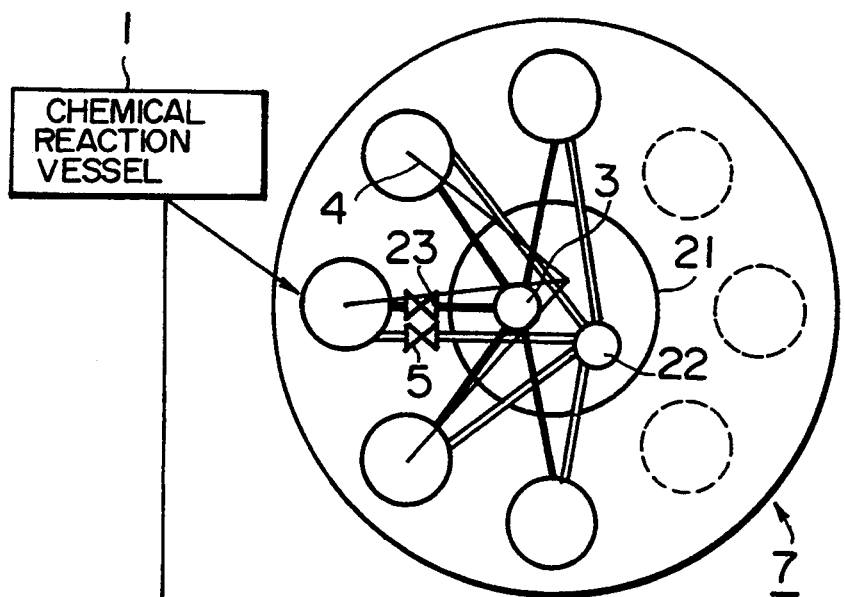
FIGS. 1A and 1B are views showing a first example of a three-dimensional arrangement of chemical reaction vessels according to the present invention.
Figure 1B:
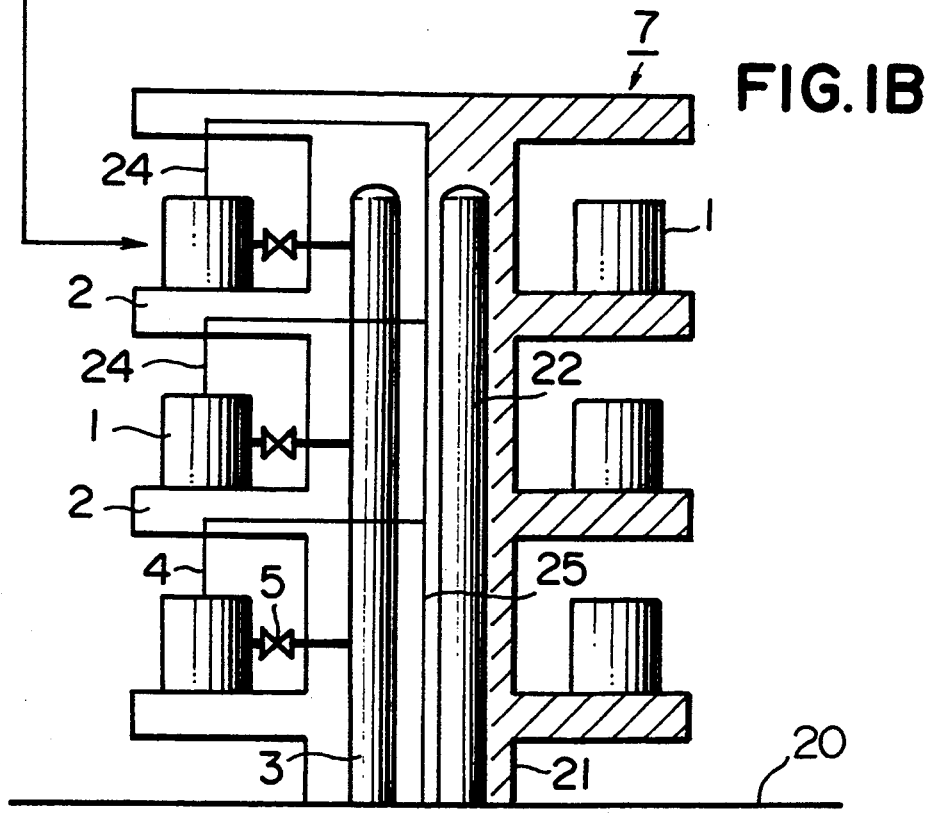

One preferred embodiment of the present invention will now be described with reference to FIGS. 1A and 1B. FIG. 1A shows one chemical reaction portion 7, and FIG. 1B shows a partly cross-sectional view in the direction of the height, and FIG. 1A is a view of each floor as seen from the upper side. A pillar 21 is mounted on a foundation floor surface 20, and floors 2, for example, of a circular shape are provided on the pillar 21 at predetermined intervals in the direction of the height of the pillar 21. A plurality of chemical reaction vessels 1 are provided on each floor 2, and are arranged on a circle, that is, circumferentially spaced at predetermined intervals from one another. Cavity portions 3 and 22 are formed in the pillar 21, and extend along the length of the pillar 21, that is, in the direction of the height thereof. For example, gas fuel (reactive group) necessary for the reaction in the chemical reaction vessel 1 is fed from the cavity portion 3 to each chemical reaction vessel 1 via an isolation valve 5. Also, oxygen (reactive group) necessary for the reaction in the chemical reaction vessel 1 is fed from the cavity portion 22 to each chemical reaction vessel 1 via an isolation valve 23. Although only one set of valves 5 and 23 are shown for the sake of simplicity of the illustration of FIG. 1A, a set of valves 5 and 23 are associated with each chemical reaction vessel 1. An electrical output from each chemical reaction vessel 1 is fed to the exterior of the installation via a wire 24 (which has a breaker (not shown)) and a bus 25 provided in the pillar 21 in the direction of the height thereof.

In the foregoing, although the process of producing an electrical output by supplying the gas fuel and oxygen has been described, this arrangement can be applied to other processes in so far as the input necessary for the reaction in the chemical reaction vessel is supplied from the cavity portion or a bus within the pillar, and the output or an exhaust matter is similarly discharged through the interior of the pillar. The input into the chemical reaction vessel, as well as the output therefrom, can be separated from those of the other chemical reaction vessels by means of the isolation valves 5 and 23 or breakers, and therefore the chemical reaction vessels can be separated from one another, and can be repaired independently of one another.

Figure 2A:
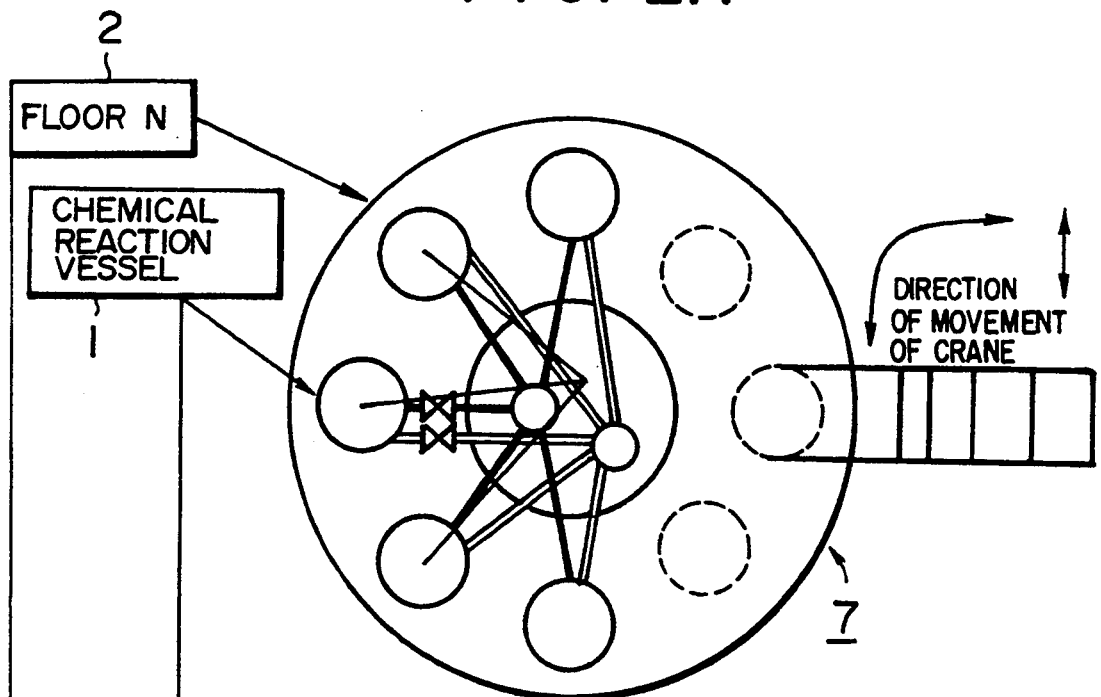
FIGS. 2A and 2B are views explanatory of the manner of removing the chemical reaction vessels in FIGS. 1A and 1B.
Figure 2B:
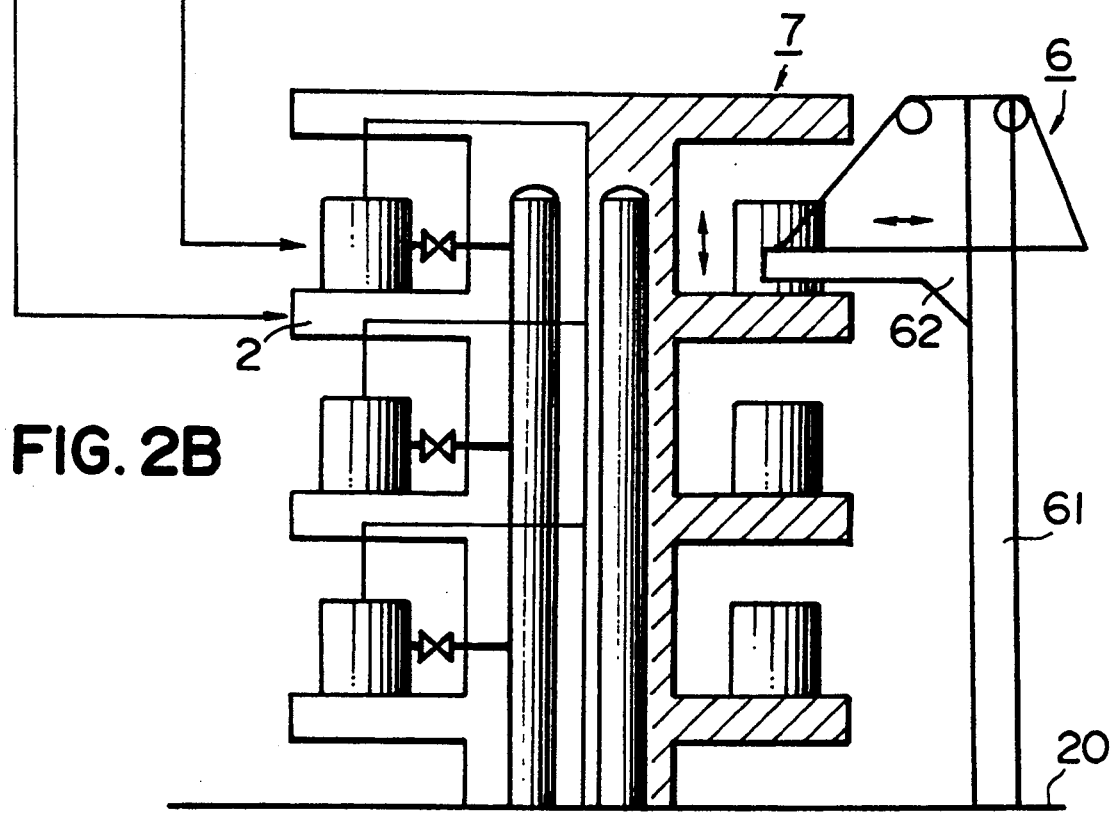

For separating the chemical reaction vessel 1 for repairing purposes, the chemical reaction vessel 1 is removed by a crane 6 from the floor 2 radially outwardly of the circle on which the plurality of the chemical reaction vessels 1 are disposed, as shown in FIGS. 2A and 2B, the crane 6 being located outside the system of the chemical reaction portion 7. The crane 6 comprises a base portion 61 and a movable portion 62, and the movable portion 62 is movable vertically (upward and downward) and horizontally, and is rotatable relative to the base portion 61. More specifically, for removing the chemical reaction vessel 1 to a position outside the system, the movable portion 62 is moved upward at a location where this movable portion will not interfere with the floors 2, and when the movable portion 62 reaches a desired floor 2, the movable portion 62 is rotated to approach this floor, and then the movable portion 62 is moved horizontally to approach the chemical reaction vessel 1 to be removed, and then the chemical reaction vessel 1 to be removed is placed on a bed of the movable portion 62, and then is brought down to the floor surface 20 according to a procedure reverse to the above operation. Before this removal is carried out, the isolation valves 5 and 23 are shut off, and the breaker is opened, and in this condition the chemical reaction vessel is mechanically separated. The crane 6 may be of such a type that it is movable on the floor surface 20.

Figure 3A:
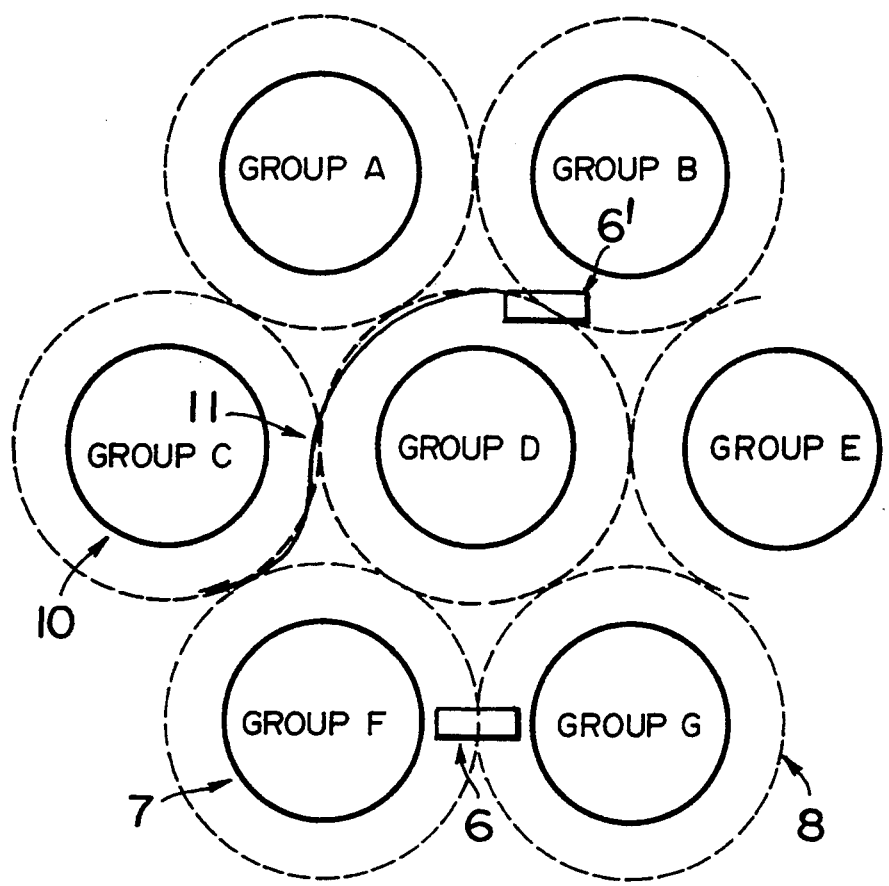
FIGS. 3A and 3B are views showing an arrangement of a plurality of chemical reaction portions 7.
Figure 3B:
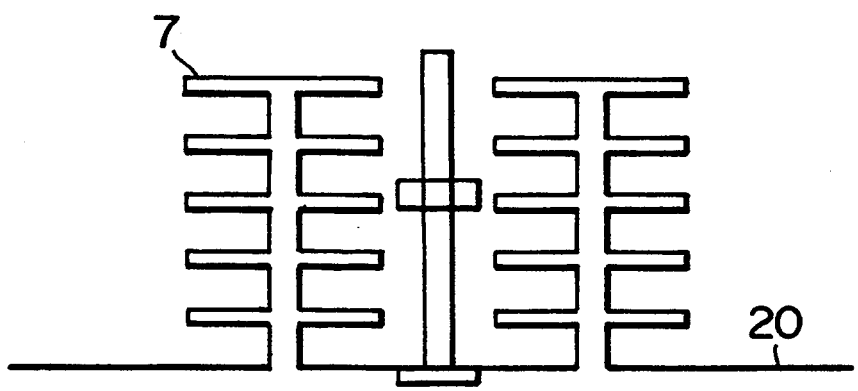

FIGS. 3A and 3B show an arrangement of a plurality of chemical reaction portions 7, and this arrangement can enhance the yield most efficiently. Each dot line 8 represents a path of travel of a movable crane 6, and the chemical reaction vessel is transferred to a disassembly-/inspection location via a suitable route. If there is provided at least one movable crane 6, it can cover the whole of the plant. When a stack location 10 requiring an exchange is indicated, the movable crane (No. 1) 6' standing by between a group B and a group D moves to the location 10 along a crane travel path 11. Therefore, the plant can be covered by one movable crane, though it may depend on the number of the groups of chemical reaction vessels.

Figure 4:
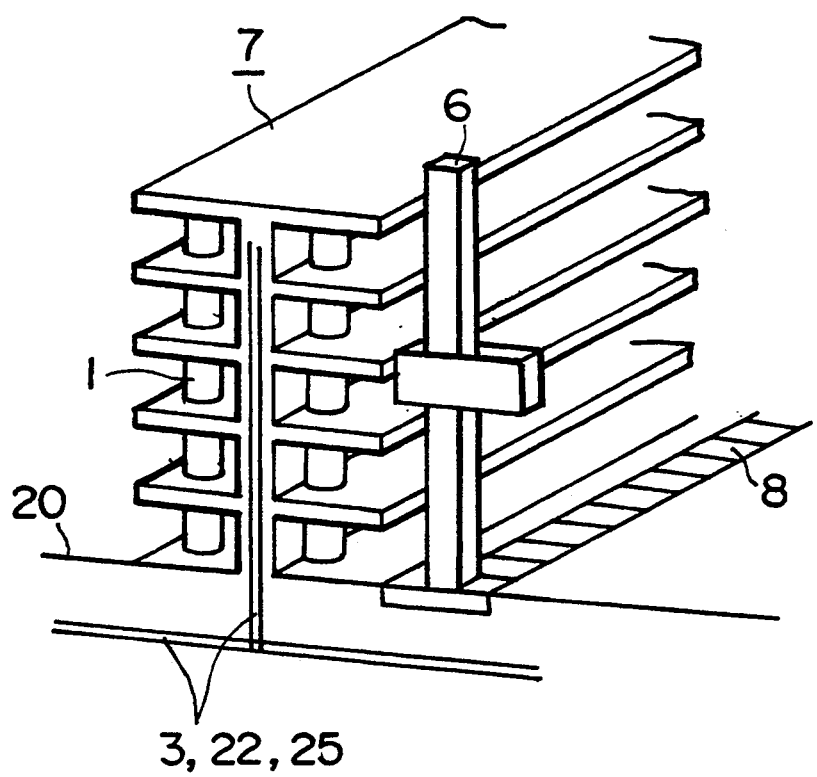
FIG. 4 is a view showing a second example of a three-dimensional arrangement of chemical reaction vessels according to the present invention.
Figure 5A:
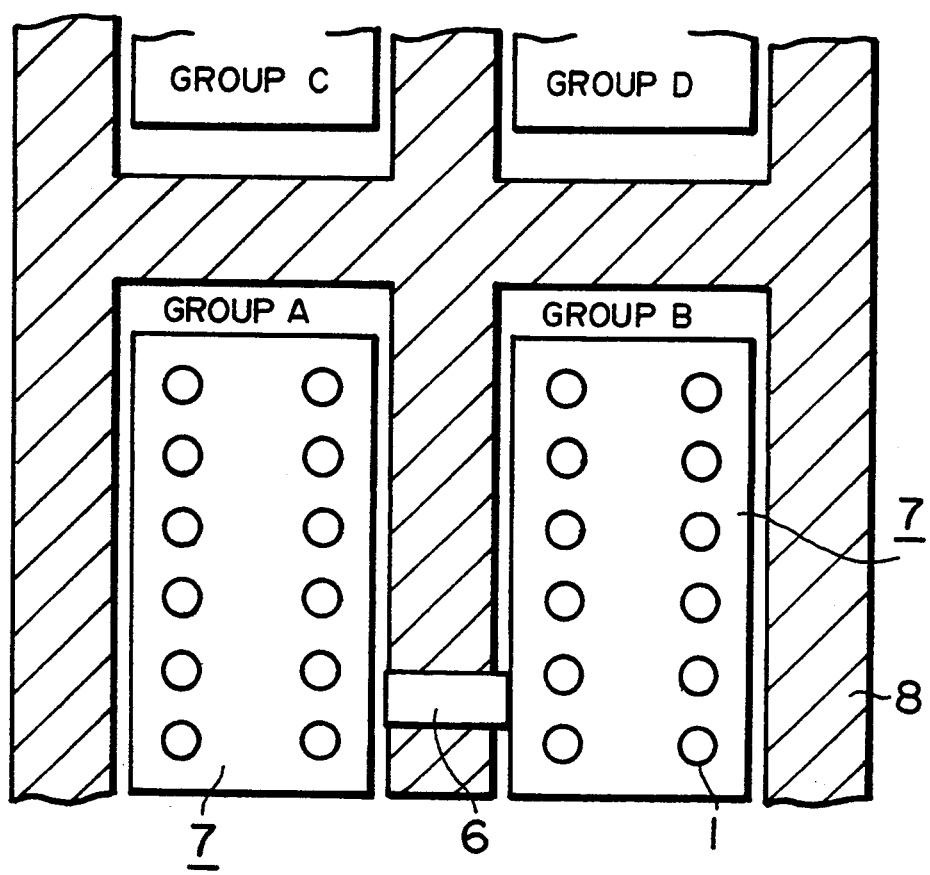
FIGS. 5A and 5B are views explanatory of the manner of removing the chemical reaction vessels in FIG. 4.
Figure 5B:
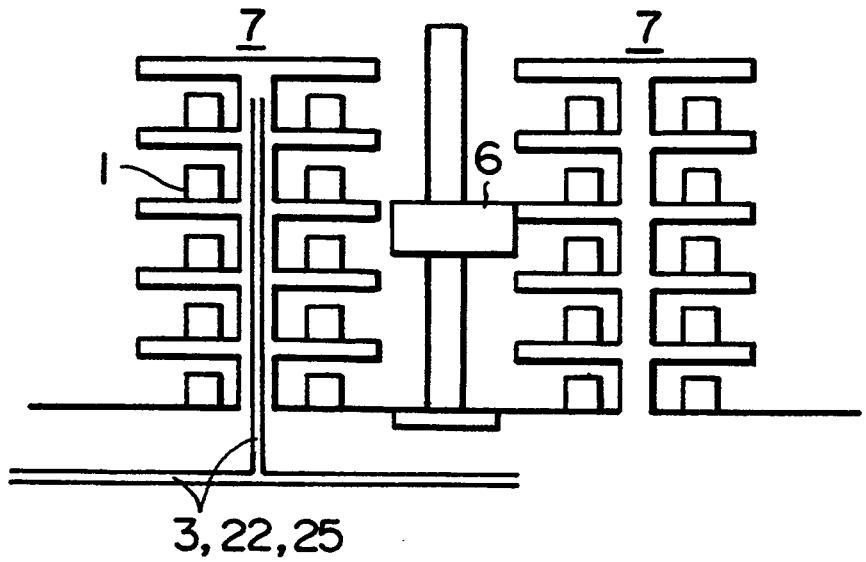

Next, reference is now made to a chemical reaction portion 7 of not a cylindrical shape but an H-shape. As in the above-mentioned cylindrical type, an internal space of a rectangular parallelepipedic shape serves as spaces 3, 22 and 25 for treating the process, and an outer space is used for maintenance purposes, as shown in FIG. 4. The overall construction of the H-type is as shown in FIGS. 5A and 5B, and a path 8 of travel of a movable crane 6 is in the shape of a combination of Japanese characters.

In the present invention, a number of chemical reaction vessels can be arranged in such a manner as to achieve their intended process and the maintenance rationally, and at the same time the installation area can be reduced. From an economical point of view, if the installation is provided near a large city, enormous effects can be produced, though it may vary depending on the number of the stories of the three-dimensional structure.

What is claimed is:

1. A chemical reaction installation comprising a pillar mounted on a floor surface; a plurality of floors provided on said pillar in spaced relation to one another in a direction of a height of said pillar; a chemical reaction portion formed by a plurality of chemical reaction vessels provided on each of said floors; a through portion provided at an inside of the chemical reaction installation and extending through each of said plurality of floors, process variables occurring in accordance with a reaction in said chemical reaction vessels being supplied into or discharged from said chemical reaction vessels through said through portion; and a crane provided at the outside of said chemical reaction portion for exchanging each of said chemical reaction vessels.

2. A chemical reaction installation comprising a plurality of pillars mounted on a floor surface; a plurality of floors provided on each of said pillars in spaced relation to one another in a direction of a height of said pillar; a plurality of chemical reaction portions each formed by a plurality of chemical reaction vessels provided on each of said floors; a through portion provided at an inside of the chemical reaction installation and extending through each of said plurality of floors, process variables occurring in accordance with a reaction in said chemical reaction vessels being supplied into or discharged from said chemical reaction vessels through said through portion; and at least one crane provided between said chemical reaction portions for exchanging said chemical reaction vessels.

3. A chemical reaction installation according to claim 2, wherein said through portion is provided within a cavity in each of said plurality of pillars.

4. A chemical reaction installation according to claim 2, wherein said crane is movable vertically and is rotatable.

5. A chemical reaction installation according to claim 2, further comprising a plurality of valves, at least one of which is provided between said through portion and each of said plurality of chemical reaction vessels.

6. A chemical reaction installation according to claim 1 wherein said through portion is provided within a cavity in said pillar.

7. A chemical reaction installation according to claim 1, wherein said crane is movable vertically and is rotatable.

8. A chemical reaction installation according to claim 1, further comprising a plurality of valves, at least one of which is provided between said through portion and each of said plurality of chemical reaction vessels.

9. A chemical reaction installation, comprising:
a plurality of floors supported in spaced relation to one another in a vertical direction;
a plurality of chemical reaction vessels provided at least around a perimeter of each of said plurality of floors;
at least one input conduit extending vertically through said plurality of floors inside said perimeter, each of said plurality of chemical reaction vessels being operably connected to said at least one input conduit via an isolation valve, whereby reactants can be selectively supplied to each chemical reaction vessel from said input conduit;

an output conduit extending vertically through said plurality of floors inside said perimeter thereof, each of said plurality of chemical reaction vessels being operably connected to said output conduits, whereby a product produced in each chemical reaction vessel can be supplied from each chemical reaction vessel to said output conduit;

a crane provided outside said perimeter of said floors, said crane being movable vertically and being rotatable; wherein spaces between floors around said perimeter of said floors are open so that said crane can remove any of said plurality of chemical reaction vessels from any of said floors across and to outside said perimeter.

10. A chemical reaction installation according to claim 9, wherein said chemical reaction installation is a fuel cell electric power generating installation and a plurality of input conduits are provided for supplying gas fuel and oxygen, and said output conduit is a bus operably connected to each of said chemical reaction vessels via a wire.

11. A chemical reaction installation according to claim 9, wherein said plurality of floors are supported by a pillar and said at least one input conduit and said output conduit are provided in at least one cavity in said pillar.

* * * * *